(12) United States Patent
Roddy et al.

(10) Patent No.: US 9,512,351 B2
(45) Date of Patent: Dec. 6, 2016

(54) WELL TREATMENT FLUIDS AND METHODS UTILIZING NANO-PARTICLES

(71) Applicant: Halliburton Energy Services, Inc., Houston, TX (US)

(72) Inventors: Craig Wayne Roddy, Duncan, OK (US); Jiten Chatterji, Duncan, OK (US); Roger Stanley Cromwell, Walters, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/025,638

(22) Filed: Sep. 12, 2013

(65) Prior Publication Data

US 2014/0008067 A1    Jan. 9, 2014

Related U.S. Application Data

(60) Continuation-in-part of application No. 12/833,189, filed on Jul. 9, 2010, now Pat. No. 8,598,093, which is a division of application No. 12/472,561, filed on May 27, 2009, now Pat. No. 7,784,542, which is a continuation-in-part of application No. 12/426,645, filed on Apr. 20, 2009, now Pat. No. 7,806,183, which is a continuation-in-part of application No. 11/747,002, filed on May 10, 2007, now Pat. No. 7,559,369.

(51) Int. Cl.
*C09K 8/80* (2006.01)
*E21B 43/267* (2006.01)
*B82Y 30/00* (2011.01)
(Continued)

(52) U.S. Cl.
CPC .................. *C09K 8/80* (2013.01); *B82Y 30/00* (2013.01); *C04B 14/062* (2013.01); *C04B 28/02* (2013.01); *C09K 8/426* (2013.01); *C09K 8/428* (2013.01); *C09K 8/467* (2013.01); *C09K 8/62* (2013.01); *E21B 33/14* (2013.01); *E21B 43/267* (2013.01); *B82Y 99/00* (2013.01);
(Continued)

(58) Field of Classification Search
None
See application file for complete search history.

(56) References Cited

U.S. PATENT DOCUMENTS 2,094,316 A    9/1937    Cross et al.
2,329,940 A    9/1943    Ponzer
(Continued)

FOREIGN PATENT DOCUMENTS

| CA | 2514492 | 9/2004 |
|---|---|---|
| CA | 2153372 A1 | 1/2006 |

(Continued)

OTHER PUBLICATIONS

Herndon, "Setting Downhole Plugs: A State-of-the-Art", Petroleum Engineer International, Apr. 1978.
(Continued)

*Primary Examiner* — John J Figueroa
(74) *Attorney, Agent, or Firm* — Craig W. Roddy; Tumey L.L.P.

(57) ABSTRACT

Disclosed embodiments relate to well treatment fluids and methods that utilize nano-particles. Exemplary nano-particles are selected from the group consisting of particulate nano-silica, nano-alumina, nano-zinc oxide, nano-boron, nano-iron oxide, and combinations thereof. Embodiments also relate to methods of cementing that include the use of nano-particles. An exemplary method of cementing comprises introducing a cement composition into a subterranean formation, wherein the cement composition comprises cement, water and a particulate nano-silica. Embodiments also relate to use of nano-particles in drilling fluids, completion fluids, simulation fluids, and well clean-up fluids.

14 Claims, 1 Drawing Sheet

(51) Int. Cl.
  *C04B 28/02*    (2006.01)
  *C09K 8/42*     (2006.01)
  *C09K 8/467*    (2006.01)
  *E21B 33/14*    (2006.01)
  *C04B 14/06*    (2006.01)
  *C09K 8/62*     (2006.01)
  *B82Y 99/00*    (2011.01)
  *C04B 111/00*   (2006.01)

(52) U.S. Cl.
  CPC . *C04B 2111/00008* (2013.01); *C09K 2208/10* (2013.01); *Y10S 507/906* (2013.01); *Y10S 977/963* (2013.01)

(56) References Cited

U.S. PATENT DOCUMENTS

| | | |
|---|---|---|
| 2,729,426 A | 1/1956 | Smith |
| 2,805,719 A | 9/1957 | Anderson |
| 2,842,205 A | 7/1958 | Allen et al. |
| 2,848,051 A | 8/1958 | Willaims |
| 2,857,286 A | 10/1958 | Striker |
| 2,871,133 A | 1/1959 | Palonen et al. |
| 2,880,096 A | 3/1959 | Hurley |
| 2,890,169 A | 6/1959 | Prokop |
| 2,933,135 A | 4/1960 | Johnson |
| 2,945,769 A | 7/1960 | Gama et al. |
| 2,952,318 A | 9/1960 | Ritch |
| 2,959,223 A | 11/1960 | Harmon et al. |
| 2,978,024 A | 4/1961 | Davis |
| 3,026,938 A | 3/1962 | Huitt et al. |
| 3,079,268 A | 2/1963 | Brooks |
| 3,153,450 A | 10/1964 | Foster et al. |
| 3,168,139 A | 2/1965 | Kennedy et al. |
| 3,219,112 A | 11/1965 | Sauber et al. |
| 3,336,979 A | 8/1967 | Ingraham et al. |
| 3,353,601 A | 11/1967 | Dollarhide et al. |
| 3,366,177 A | 1/1968 | Powers et al. |
| 3,381,748 A | 5/1968 | Peters et al. |
| 3,454,095 A | 7/1969 | Messenger et al. |
| 3,467,193 A | 9/1969 | Messenger |
| 3,499,491 A | 3/1970 | Wyant et al. |
| 3,557,876 A | 1/1971 | Tragesser |
| 3,607,326 A | 9/1971 | Serafin |
| RE27,271 E | 1/1972 | Hamsberger et al. |
| 3,748,159 A | 7/1973 | George |
| 3,759,326 A | 9/1973 | Christopher et al. |
| 3,817,330 A | 6/1974 | Christopher et al. |
| 3,854,985 A | 12/1974 | Suzuki et al. |
| 3,868,999 A | 3/1975 | Christopher et al. |
| 3,876,005 A | 4/1975 | Fincher et al. |
| 3,877,522 A | 4/1975 | Knight et al. |
| 3,887,009 A | 6/1975 | Miller et al. |
| 3,887,385 A | 6/1975 | Quist et al. |
| 3,888,311 A | 6/1975 | Cooke, Jr. |
| 3,951,824 A | 4/1976 | Maxson et al. |
| 3,958,638 A | 5/1976 | Johnston |
| 3,965,986 A | 6/1976 | Christopher |
| 4,018,617 A | 4/1977 | Nicholson |
| 4,031,184 A | 6/1977 | McCord |
| 4,036,301 A | 7/1977 | Powers et al. |
| 4,047,567 A | 9/1977 | Childs et al. |
| 4,142,910 A | 3/1979 | Kraemer et al. |
| 4,176,720 A | 12/1979 | Wilson |
| 4,202,413 A | 5/1980 | Messenger |
| 4,202,795 A | 5/1980 | Burnham et al. |
| 4,235,291 A | 11/1980 | Messenger |
| 4,268,316 A | 5/1981 | Wills et al. |
| 4,274,881 A | 6/1981 | Langton et al. |
| 4,284,433 A | 8/1981 | Aignesberger et al. |
| 4,321,243 A | 3/1982 | Comwell et al. |
| 4,341,562 A | 7/1982 | Ahlbeck |
| 4,353,746 A | 10/1982 | Birchall et al. |
| RE31,190 E | 3/1983 | Detroit et al. |
| 4,385,935 A | 5/1983 | Skjeldal |
| 4,400,474 A | 8/1983 | Copperthwaite et al. |
| 4,407,677 A | 10/1983 | Wills et al. |
| 4,432,800 A | 2/1984 | Kneller et al. |
| 4,435,216 A | 3/1984 | Diehl et al. |
| 4,455,169 A | 6/1984 | Chatterji |
| 4,460,292 A | 7/1984 | Durham et al. |
| 4,494,990 A | 1/1985 | Harris |
| 4,506,734 A | 3/1985 | Nolte |
| 4,515,635 A | 5/1985 | Rao et al. |
| 4,519,452 A | 5/1985 | Tsao et al. |
| 4,555,269 A | 11/1985 | Rao et al. |
| 4,614,599 A | 9/1986 | Walker |
| 4,624,711 A | 11/1986 | Styron |
| 4,633,950 A | 1/1987 | Delhommer et al. |
| 4,643,362 A | 2/1987 | Serafin |
| 4,650,520 A | 3/1987 | Johnsen et al. |
| 4,660,642 A | 4/1987 | Young |
| 4,676,317 A | 6/1987 | Fry et al. |
| 4,676,832 A | 6/1987 | Childs et al. |
| 4,700,777 A | 10/1987 | Luers |
| 4,711,401 A | 12/1987 | Serafin |
| 4,715,986 A | 12/1987 | Gruning et al. |
| 4,721,160 A | 1/1988 | Parcevaux et al. |
| 4,732,213 A | 3/1988 | Bennett et al. |
| 4,741,401 A | 5/1988 | Walles et al. |
| 4,741,782 A | 5/1988 | Styron |
| RE32,742 E | 9/1988 | Skjeldal |
| 4,770,796 A | 9/1988 | Jacobs |
| 4,784,223 A | 11/1988 | Worrall et al. |
| 4,822,421 A | 4/1989 | Crabb |
| 4,848,973 A | 7/1989 | Yokota et al. |
| 4,883,125 A | 11/1989 | Wilson et al. |
| 4,935,060 A | 6/1990 | Dingsoyr |
| 4,941,536 A | 7/1990 | Brothers et al. |
| 4,953,620 A | 9/1990 | Bloys et al. |
| 4,961,790 A | 10/1990 | Smith et al. |
| 4,992,102 A | 2/1991 | Barbour |
| 5,030,366 A | 7/1991 | Wilson et al. |
| 5,049,288 A | 9/1991 | Brothers et al. |
| 5,058,679 A | 10/1991 | Hale et al. |
| RE33,747 E | 11/1991 | Hartley et al. |
| 5,086,850 A | 2/1992 | Harris et al. |
| 5,102,558 A | 4/1992 | McDougall et al. |
| 5,121,795 A | 6/1992 | Ewert et al. |
| 5,123,487 A | 6/1992 | Harris et al. |
| 5,125,455 A * | 6/1992 | Harris et al. ............ 166/292 |
| 5,127,473 A | 7/1992 | Harris et al. |
| 5,127,955 A | 7/1992 | Fry |
| 5,149,370 A | 9/1992 | Claussen et al. |
| 5,151,203 A | 9/1992 | Riley et al. |
| 5,183,505 A | 2/1993 | Spinney |
| 5,203,629 A | 4/1993 | Valle et al. |
| 5,207,832 A | 5/1993 | Baffreau et al. |
| 5,213,160 A | 5/1993 | Nahm et al. |
| 5,236,501 A | 8/1993 | Nomachi et al. |
| 5,238,064 A | 8/1993 | Dahl et al. |
| 5,253,991 A | 10/1993 | Yokota et al. |
| 5,263,542 A | 11/1993 | Brothers |
| 5,266,111 A | 11/1993 | Barbour |
| 5,292,512 A | 3/1994 | Schaefer et al. |
| 5,295,543 A | 3/1994 | Terry et al. |
| 5,305,831 A | 4/1994 | Nahm |
| 5,314,022 A | 5/1994 | Cowan et al. |
| 5,320,851 A | 6/1994 | Mars et al. |
| 5,327,968 A | 7/1994 | Onan et al. |
| 5,337,824 A | 8/1994 | Cowan |
| 5,339,903 A | 8/1994 | Eoff et al. |
| 5,340,397 A | 8/1994 | Brothers |
| 5,346,012 A | 9/1994 | Heathman et al. |
| 5,352,288 A | 10/1994 | Mallow |
| 5,355,954 A | 10/1994 | Onan |
| 5,358,044 A | 10/1994 | Hale et al. |
| 5,358,047 A | 10/1994 | Himes et al. |
| 5,358,049 A | 10/1994 | Hale et al. |
| 5,361,841 A | 11/1994 | Hale et al. |
| 5,361,842 A | 11/1994 | Hale et al. |
| 5,368,103 A | 11/1994 | Heathman et al. |
| 5,370,185 A | 12/1994 | Cowan et al. |
| 5,372,641 A | 12/1994 | Carpenter |

(56) References Cited

U.S. PATENT DOCUMENTS

| | | |
|---|---|---|
| 5,373,901 A | 12/1994 | Norman et al. |
| 5,375,661 A | 12/1994 | Daneshy et al. |
| 5,382,290 A | 1/1995 | Nahm et al. |
| 5,383,521 A | 1/1995 | Onan et al. |
| 5,383,967 A | 1/1995 | Chase |
| 5,389,706 A | 2/1995 | Heathman et al. |
| 5,398,758 A | 3/1995 | Onan et al. |
| 5,398,759 A | 3/1995 | Rodrigues et al. |
| 5,423,379 A | 6/1995 | Hale et al. |
| 5,439,056 A | 8/1995 | Cowan |
| 5,454,867 A | 10/1995 | Brothers et al. |
| 5,456,751 A | 10/1995 | Zandi et al. |
| 5,458,195 A | 10/1995 | Totten et al. |
| 5,464,060 A | 11/1995 | Hale et al. |
| 5,472,051 A | 12/1995 | Brothers |
| 5,476,142 A | 12/1995 | Kajita et al. |
| 5,476,144 A | 12/1995 | Nahm et al. |
| 5,484,480 A | 1/1996 | Styron |
| 5,494,513 A | 2/1996 | Fu et al. |
| 5,499,677 A | 3/1996 | Cowan |
| 5,509,962 A | 4/1996 | Tang |
| 5,515,921 A | 5/1996 | Cowan et al. |
| 5,518,996 A * | 5/1996 | Maroy et al. ............... 507/100 |
| 5,520,730 A | 5/1996 | Barbour |
| 5,529,624 A | 6/1996 | Riegler |
| 5,536,311 A | 7/1996 | Rodrigues |
| 5,542,782 A | 8/1996 | Carter et al. |
| 5,551,976 A | 9/1996 | Allen |
| 5,569,324 A | 10/1996 | Totten et al. |
| 5,575,841 A | 11/1996 | Dry |
| 5,580,379 A | 12/1996 | Cowan |
| 5,585,333 A | 12/1996 | Dahl et al. |
| 5,588,488 A | 12/1996 | Vijn et al. |
| 5,588,489 A | 12/1996 | Chatterji et al. |
| 5,603,961 A | 2/1997 | Suzuki et al. |
| 5,660,624 A | 8/1997 | Dry |
| 5,663,230 A | 9/1997 | Haman |
| 5,673,753 A | 10/1997 | Hale et al. |
| 5,688,844 A | 11/1997 | Chatterji et al. |
| 5,693,137 A | 12/1997 | Styron |
| 5,711,383 A | 1/1998 | Terry et al. |
| 5,716,910 A | 2/1998 | Totten et al. |
| 5,728,209 A | 3/1998 | Bury et al. |
| 5,728,654 A | 3/1998 | Dobson et al. |
| 5,741,357 A | 4/1998 | Sheikh |
| 5,766,323 A | 6/1998 | Butler et al. |
| 5,769,939 A | 6/1998 | Dingsoyr |
| 5,779,787 A | 7/1998 | Brothers et al. |
| 5,783,541 A | 7/1998 | Tack et al. |
| 5,795,060 A | 8/1998 | Stephens |
| 5,820,670 A | 10/1998 | Chatterji et al. |
| 5,851,960 A | 12/1998 | Totten et al. |
| 5,866,516 A | 2/1999 | Costin |
| 5,874,387 A | 2/1999 | Carpenter et al. |
| 5,879,699 A | 3/1999 | Lerner |
| 5,897,699 A | 4/1999 | Chatterji et al. |
| 5,900,053 A | 5/1999 | Brothers et al. |
| 5,913,364 A | 6/1999 | Sweatman |
| 5,988,279 A | 11/1999 | Udarbe et al. |
| 5,989,334 A | 11/1999 | Dry |
| 6,011,075 A | 1/2000 | Parris et al. |
| 6,022,408 A | 2/2000 | Stokes et al. |
| 6,027,561 A | 2/2000 | Gruber et al. |
| 6,060,434 A | 5/2000 | Sweatman et al. |
| 6,060,535 A * | 5/2000 | Villar et al. ............... 166/293 |
| 6,063,738 A | 5/2000 | Chatterji et al. |
| 6,138,759 A | 10/2000 | Chatterji et al. |
| 6,143,069 A | 11/2000 | Brothers et al. |
| 6,145,591 A | 11/2000 | Boncan et al. |
| 6,153,562 A * | 11/2000 | Villar et al. ............... 507/269 |
| 6,167,967 B1 | 1/2001 | Sweatman |
| 6,170,575 B1 | 1/2001 | Reddy et al. |
| 6,210,476 B1 | 4/2001 | Chatterji |
| 6,227,294 B1 | 5/2001 | Chatterji |
| 6,230,804 B1 | 5/2001 | Mueller et al. |
| 6,244,343 B1 | 6/2001 | Brothers et al. |
| 6,245,142 B1 | 6/2001 | Reddy et al. |
| 6,258,757 B1 | 7/2001 | Sweatman et al. |
| 6,261,360 B1 | 7/2001 | Dry |
| 6,277,189 B1 | 8/2001 | Chugh |
| 6,279,655 B1 | 8/2001 | Pafitis et al. |
| 6,312,515 B1 * | 11/2001 | Barlet-Gouedard et al. . 106/709 |
| 6,315,042 B1 | 11/2001 | Griffith et al. |
| 6,332,920 B1 * | 12/2001 | Noik et al. .................. 106/692 |
| 6,332,921 B1 | 12/2001 | Brothers et al. |
| 6,367,550 B1 | 4/2002 | Chatterji et al. |
| 6,379,456 B1 | 4/2002 | Heathman et al. |
| 6,390,197 B1 | 5/2002 | Marcoy |
| 6,402,833 B1 | 6/2002 | O'Hearn et al. |
| 6,409,819 B1 | 6/2002 | Ko |
| 6,444,316 B1 | 9/2002 | Reddy et al. |
| 6,457,524 B1 | 10/2002 | Roddy |
| 6,471,975 B1 | 10/2002 | Banovetz et al. |
| 6,478,869 B2 | 11/2002 | Reddy et al. |
| 6,478,870 B2 | 11/2002 | Marko |
| 6,488,089 B1 | 12/2002 | Bour et al. |
| 6,488,763 B2 | 12/2002 | Brothers et al. |
| 6,488,764 B2 | 12/2002 | Westerman |
| 6,494,951 B1 | 12/2002 | Reddy et al. |
| 6,500,252 B1 | 12/2002 | Chatterji et al. |
| 6,500,253 B2 | 12/2002 | Norman et al. |
| 6,502,636 B2 | 1/2003 | Chatterji et al. |
| 6,508,305 B1 | 1/2003 | Brannon et al. |
| 6,524,384 B2 | 2/2003 | Griffith et al. |
| 6,527,051 B1 | 3/2003 | Reddy et al. |
| 6,527,849 B2 | 3/2003 | Dry |
| 6,547,871 B2 | 4/2003 | Chatterji et al. |
| 6,547,891 B2 | 4/2003 | Linden et al. |
| 6,554,067 B2 | 4/2003 | Davies et al. |
| 6,554,071 B1 | 4/2003 | Reddy et al. |
| 6,561,273 B2 | 5/2003 | Brothers et al. |
| 6,562,122 B2 | 5/2003 | Dao et al. |
| 6,565,647 B1 | 5/2003 | Day et al. |
| 6,572,697 B2 | 6/2003 | Gleeson et al. |
| 6,599,863 B1 | 7/2003 | Palmer et al. |
| 6,610,139 B2 | 8/2003 | Reddy et al. |
| 6,626,243 B1 | 9/2003 | Go Boncan |
| 6,631,766 B2 | 10/2003 | Brothers et al. |
| 6,632,527 B1 | 10/2003 | McDaniel et al. |
| 6,645,288 B1 | 11/2003 | Dargaud et al. |
| 6,645,290 B1 | 11/2003 | Barbour |
| 6,648,962 B2 | 11/2003 | Berke et al. |
| 6,656,265 B1 | 12/2003 | Garnier et al. |
| 6,656,266 B1 | 12/2003 | Barlet-Gouedard et al. |
| 6,660,080 B2 | 12/2003 | Reddy et al. |
| 6,666,268 B2 | 12/2003 | Griffith et al. |
| 6,668,929 B2 | 12/2003 | Griffith et al. |
| 6,689,208 B1 | 2/2004 | Brothers |
| 6,702,044 B2 | 3/2004 | Reddy et al. |
| 6,706,108 B2 | 3/2004 | Polston |
| 6,716,282 B2 | 4/2004 | Griffith et al. |
| 6,722,433 B2 | 4/2004 | Brothers et al. |
| 6,729,405 B2 | 5/2004 | DiLullo et al. |
| 6,740,141 B2 | 5/2004 | Espin et al. |
| 6,767,398 B2 | 7/2004 | Trato |
| 6,770,604 B2 | 8/2004 | Reddy |
| 6,776,237 B2 | 8/2004 | Dao et al. |
| 6,796,378 B2 | 9/2004 | Reddy et al. |
| 6,797,054 B2 | 9/2004 | Chatterji et al. |
| 6,808,561 B2 | 10/2004 | Genge |
| 6,811,603 B2 | 11/2004 | Brothers et al. |
| 6,823,940 B2 | 11/2004 | Reddy et al. |
| 6,832,651 B2 | 12/2004 | Ravi et al. |
| 6,835,243 B2 | 12/2004 | Brothers et al. |
| 6,837,316 B2 | 1/2005 | Reddy et al. |
| 6,840,318 B2 | 1/2005 | Lee et al. |
| 6,840,996 B2 | 1/2005 | Morioka et al. |
| 6,846,357 B2 | 1/2005 | Reddy et al. |
| 6,848,519 B2 | 2/2005 | Reddy et al. |
| 6,861,392 B2 | 3/2005 | Shaarpour |
| 6,874,578 B1 | 4/2005 | Garnier et al. |
| 6,881,709 B2 | 4/2005 | Nelson et al. |
| 6,883,609 B2 | 4/2005 | Drochon et al. |
| 6,887,833 B2 | 5/2005 | Brothers et al. |

(56) References Cited

U.S. PATENT DOCUMENTS

| | | |
|---|---|---|
| 6,889,767 B2 | 5/2005 | Reddy et al. |
| 6,902,001 B2 | 6/2005 | Dargaud et al. |
| 6,904,971 B2 | 6/2005 | Brothers et al. |
| 6,907,929 B2 | 6/2005 | LeRoy-Delage et al. |
| 6,908,508 B2 | 6/2005 | Brothers |
| 6,908,888 B2 | 6/2005 | Lee et al. |
| 6,911,078 B2 | 6/2005 | Barlet-Gouedard et al. |
| 6,926,081 B2 | 8/2005 | Sweatman et al. |
| 6,962,201 B2 | 11/2005 | Brothers |
| 6,964,302 B2 | 11/2005 | Luke et al. |
| 6,978,834 B1 | 12/2005 | Chatterji |
| 6,982,000 B2 | 1/2006 | Chatterji |
| 6,983,800 B2 | 1/2006 | Chatterji |
| 6,989,057 B2 | 1/2006 | Getzlaf et al. |
| 7,007,755 B2 | 3/2006 | Reddy et al. |
| 7,013,998 B2 | 3/2006 | Ray |
| 7,022,179 B1 | 4/2006 | Dry |
| 7,026,272 B2 | 4/2006 | Reddy et al. |
| 7,032,664 B2 | 4/2006 | Lord et al. |
| 7,033,975 B2 | 4/2006 | Baran et al. |
| 7,036,592 B2 | 5/2006 | Nguyen |
| 7,044,224 B2 | 5/2006 | Nguyen |
| 7,048,053 B2 | 5/2006 | Santra et al. |
| 7,059,415 B2 | 6/2006 | Bosma et al. |
| 7,073,584 B2 | 7/2006 | Reddy et al. |
| 7,077,203 B1 | 7/2006 | Roddy et al. |
| 7,081,489 B2 | 7/2006 | Chen |
| 7,084,092 B2 | 8/2006 | Patel et al. |
| 7,084,095 B2 | 8/2006 | Lee et al. |
| 7,086,466 B2 | 8/2006 | Roddy |
| 7,087,554 B2 | 8/2006 | Youngson |
| 7,138,446 B2 | 11/2006 | Reddy et al. |
| 7,140,439 B2 | 11/2006 | Luke et al. |
| 7,140,440 B2 | 11/2006 | Luke et al. |
| 7,143,828 B2 | 12/2006 | Reddy et al. |
| 7,143,832 B2 | 12/2006 | Freyer |
| 7,147,055 B2 | 12/2006 | Brothers et al. |
| 7,147,067 B2 | 12/2006 | Getzlaf et al. |
| 7,150,321 B2 | 12/2006 | Luke et al. |
| 7,156,173 B2 | 1/2007 | Mueller |
| 7,156,174 B2 | 1/2007 | Roddy et al. |
| 7,160,844 B2 | 1/2007 | Urbanek |
| 7,172,022 B2 | 2/2007 | Reddy et al. |
| 7,174,962 B1 | 2/2007 | Roddy et al. |
| 7,178,590 B2 | 2/2007 | Vargo |
| 7,182,137 B2 | 2/2007 | Fyten et al. |
| 7,198,104 B2 | 4/2007 | Griffith et al. |
| 7,199,086 B1 | 4/2007 | Roddy et al. |
| 7,204,307 B2 | 4/2007 | Roddy et al. |
| 7,204,310 B1 | 4/2007 | Roddy et al. |
| 7,204,312 B2 | 4/2007 | Roddy et al. |
| 7,213,646 B2 | 5/2007 | Roddy et al. |
| 7,217,441 B2 | 5/2007 | Bour et al. |
| 7,255,739 B2 | 8/2007 | Brothers et al. |
| 7,264,053 B2 | 9/2007 | Vargo, Jr. et al. |
| 7,279,447 B2 | 10/2007 | Lal et al. |
| 7,284,609 B2 | 10/2007 | Roddy et al. |
| 7,284,611 B2 | 10/2007 | Reddy et al. |
| 7,284,930 B2 | 10/2007 | Shi et al. |
| 7,290,613 B2 | 11/2007 | Santra et al. |
| 7,294,194 B2 | 11/2007 | Reddy et al. |
| 7,296,597 B1 | 11/2007 | Freyer et al. |
| 7,297,664 B2 | 11/2007 | Santra et al. |
| 7,303,014 B2 | 12/2007 | Reddy et al. |
| 7,316,744 B2 | 1/2008 | De La Roij et al. |
| 7,335,252 B2 | 2/2008 | Roddy et al. |
| 7,337,841 B2 | 3/2008 | Ravi |
| 7,337,842 B2 | 3/2008 | Roddy et al. |
| 7,338,923 B2 | 3/2008 | Roddy et al. |
| 7,341,104 B2 | 3/2008 | Roddy et al. |
| 7,341,106 B2 | 3/2008 | Reddy et al. |
| 7,351,279 B2 | 4/2008 | Brothers |
| 7,353,870 B2 | 4/2008 | Roddy et al. |
| 7,381,263 B2 | 6/2008 | Roddy et al. |
| 7,387,675 B2 | 6/2008 | Roddy et al. |
| 7,393,407 B2 | 7/2008 | Dingsoyr et al. |
| 7,395,860 B2 | 7/2008 | Roddy et al. |
| 7,404,440 B2 | 7/2008 | Reddy et al. |
| 7,409,991 B2 | 8/2008 | Reddy et al. |
| 7,413,014 B2 | 8/2008 | Chatterji et al. |
| 7,422,060 B2 | 9/2008 | Hammami et al. |
| 7,424,913 B2 | 9/2008 | Roddy |
| 7,431,098 B2 | 10/2008 | Ohmer et al. |
| 7,435,768 B2 | 10/2008 | Lecolier et al. |
| 7,445,668 B2 | 11/2008 | Sommain |
| 7,445,669 B2 | 11/2008 | Roddy et al. |
| 7,451,817 B2 | 11/2008 | Reddy et al. |
| 7,459,209 B2 | 12/2008 | Smith et al. |
| 7,461,696 B2 | 12/2008 | Nguyen et al. |
| 7,478,675 B2 | 1/2009 | Roddy et al. |
| 7,482,309 B2 | 1/2009 | Ravi et al. |
| 7,488,705 B2 | 2/2009 | Reddy et al. |
| 7,540,915 B2 | 6/2009 | Lecolier |
| 7,543,642 B2 | 6/2009 | Reddy et al. |
| 7,544,640 B2 | 6/2009 | Luke et al. |
| 7,559,369 B2 * | 7/2009 | Roddy et al. ............... 166/280.2 |
| 7,572,501 B2 | 8/2009 | Li et al. |
| 7,576,042 B2 | 8/2009 | Lewis et al. |
| 7,578,347 B2 | 8/2009 | Bosma et al. |
| 7,607,482 B2 | 10/2009 | Roddy |
| 7,631,692 B2 | 12/2009 | Roddy et al. |
| 7,645,817 B2 | 1/2010 | Reddy et al. |
| 7,647,970 B2 | 1/2010 | Mueller et al. |
| 7,650,940 B2 | 1/2010 | Reddy et al. |
| 7,651,563 B2 | 1/2010 | Datta et al. |
| 7,658,796 B2 | 2/2010 | Nordmeyer |
| 7,665,537 B2 | 2/2010 | Patel et al. |
| 7,674,331 B2 | 3/2010 | Drochon |
| 7,674,332 B2 | 3/2010 | Roddy |
| 7,694,738 B2 | 4/2010 | Reddy et al. |
| 7,717,180 B2 | 5/2010 | Badalamenti et al. |
| 7,784,542 B2 | 8/2010 | Roddy et al. |
| 7,786,192 B2 | 8/2010 | Birgisson et al. |
| 7,806,183 B2 | 10/2010 | Roddy et al. |
| 7,837,412 B2 | 11/2010 | O'Hearn |
| 7,846,876 B2 | 12/2010 | Koyanagi |
| 7,871,702 B2 | 1/2011 | Rao |
| 7,892,352 B2 | 2/2011 | Roddy |
| 7,913,757 B2 | 3/2011 | Reddy et al. |
| 7,946,351 B2 | 5/2011 | Freyer |
| 8,110,039 B2 | 2/2012 | Hunt |
| 8,114,820 B2 | 2/2012 | Crews |
| 8,119,620 B2 | 2/2012 | Schramm |
| 8,183,184 B2 | 5/2012 | Berkland et al. |
| 8,183,186 B2 | 5/2012 | Luo |
| 8,226,879 B2 | 7/2012 | Genolet et al. |
| 8,273,173 B2 | 9/2012 | Mercado et al. |
| 8,333,240 B2 | 12/2012 | Roddy |
| 8,453,746 B2 | 6/2013 | Hailey, Jr. et al. |
| 8,455,404 B2 | 6/2013 | Harrower et al. |
| 8,476,203 B2 | 7/2013 | Patil et al. |
| 8,499,837 B2 | 8/2013 | Koons |
| 8,586,512 B2 | 11/2013 | Roddy et al. |
| 8,598,093 B2 | 12/2013 | Roddy et al. |
| 8,603,952 B2 | 12/2013 | Roddy et al. |
| 8,609,595 B2 | 12/2013 | Morgan et al. |
| 8,685,903 B2 | 4/2014 | Ravi et al. |
| 2002/0117090 A1 | 8/2002 | Ku |
| 2003/0116887 A1 | 6/2003 | Scott |
| 2004/0055748 A1 | 3/2004 | Reddy et al. |
| 2004/0121916 A1 | 6/2004 | Kono |
| 2004/0147388 A1 | 7/2004 | Webber et al. |
| 2004/0171499 A1 | 9/2004 | Ravi et al. |
| 2004/0187740 A1 | 9/2004 | Timmons |
| 2004/0256102 A1 | 12/2004 | Trato |
| 2005/0028976 A1 * | 2/2005 | Nguyen ............... C09K 8/516 166/276 |
| 2005/0061206 A1 | 3/2005 | Reddy et al. |
| 2005/0107265 A1 * | 5/2005 | Sullivan et al. ............... 507/271 |
| 2005/0113260 A1 | 5/2005 | Wood |
| 2005/0194141 A1 * | 9/2005 | Sinclair ............... C09K 8/805 166/280.2 |
| 2005/0244641 A1 * | 11/2005 | Vincent ............... C09K 8/62 428/403 |

(56) References Cited

U.S. PATENT DOCUMENTS

| | | |
|---|---|---|
| 2006/0016598 A1 | 1/2006 | Urbanek |
| 2006/0075932 A1* | 4/2006 | Lecolier et al. ............ 106/677 |
| 2006/0089851 A1 | 4/2006 | Silby et al. |
| 2006/0151171 A1 | 7/2006 | Davies et al. |
| 2006/0166834 A1 | 7/2006 | Roddy |
| 2006/0177661 A1* | 8/2006 | Smith .............. C04B 18/082 428/403 |
| 2006/0260513 A1 | 11/2006 | Guiterrez et al. |
| 2007/0012436 A1 | 1/2007 | Freyer |
| 2007/0056479 A1 | 3/2007 | Gray |
| 2007/0056732 A1* | 3/2007 | Roddy et al. ............... 166/292 |
| 2007/0137528 A1 | 6/2007 | LeRoy-Deluge et al. |
| 2007/0204765 A1 | 9/2007 | LeRoy-Deluge et al. |
| 2007/0255457 A1 | 11/2007 | Whitcomb et al. |
| 2007/0266903 A1 | 11/2007 | Gartner et al. |
| 2008/0023201 A1 | 1/2008 | Huang et al. |
| 2008/0108524 A1 | 5/2008 | Willberg et al. |
| 2008/0261834 A1 | 10/2008 | Simon |
| 2009/0038797 A1* | 2/2009 | Skala .................. C09K 8/80 166/280.1 |
| 2009/0124522 A1* | 5/2009 | Roddy .......................... 507/269 |
| 2009/0236097 A1 | 9/2009 | Roddy et al. |
| 2009/0260544 A1* | 10/2009 | Roddy et al. ............... 106/680 |
| 2010/0016183 A1 | 1/2010 | Roddy et al. |
| 2010/0025039 A1 | 2/2010 | Roddy et al. |
| 2010/0095871 A1* | 4/2010 | Patil et al. .................. 106/692 |
| 2010/0096135 A1 | 4/2010 | Roddy et al. |
| 2010/0252259 A1 | 10/2010 | Horton |
| 2011/0162845 A1 | 7/2011 | Ravi et al. |
| 2011/0237467 A1 | 9/2011 | Cornette |
| 2011/0312857 A1 | 12/2011 | Amanullah et al. |
| 2013/0312641 A1 | 11/2013 | Chatterji et al. |

FOREIGN PATENT DOCUMENTS

| | | |
|---|---|---|
| CN | 101544488 A | 9/2009 |
| DE | 102007042078 A1 | 3/2009 |
| DE | 102007059424 A1 | 6/2009 |
| EP | 0748782 A1 | 12/1996 |
| EP | 0814067 A1 | 12/1997 |
| EP | 1236701 A1 | 9/2002 |
| EP | 1394137 A2 | 7/2003 |
| EP | 1348831 A1 | 10/2003 |
| EP | 1686234 A1 | 8/2006 |
| EP | 1719741 A1 | 11/2006 |
| EP | 2465910 A1 | 11/2009 |
| EP | 2623579 | 8/2013 |
| FR | 2787105 A1 | 6/2000 |
| GB | 1469954 | 4/1997 |
| GB | 2429725 A | 3/2007 |
| JP | 52117316 A | 10/1977 |
| JP | 10110487 A | 4/1998 |
| SU | 1373781 A1 | 2/1988 |
| WO | WO 83/01443 A1 | 4/1983 |
| WO | WO 90/11977 | 4/1990 |
| WO | WO 9011977 A1 * | 10/1990 |
| WO | WO 97/05079 A1 | 2/1997 |
| WO | WO 97/49644 A1 | 12/1997 |
| WO | WO 98/54108 A1 | 12/1998 |
| WO | WO 00/63134 A1 | 1/2000 |
| WO | WO 00/34199 | 6/2000 |
| WO | WO 00/49272 A1 | 8/2000 |
| WO | WO 00/50357 A1 | 8/2000 |
| WO | WO 01/87796 A1 | 11/2001 |
| WO | WO 03/008756 A1 | 1/2003 |
| WO | WO 03/031364 A1 | 4/2003 |
| WO | WO 2004/001188 A1 | 12/2003 |
| WO | WO 2004/057715 A2 | 7/2004 |
| WO | WO 2004/101951 A1 | 11/2004 |
| WO | WO 2004/101952 A1 | 11/2004 |
| WO | WO 2005/047212 A1 | 5/2005 |
| WO | WO 2005/061846 A1 | 7/2005 |
| WO | WO 2005/080287 A1 | 8/2005 |
| WO | WO 2006/032841 A1 | 3/2006 |
| WO | WO 2006/053896 A1 | 5/2006 |
| WO | WO 2008/034461 A1 | 3/2008 |
| WO | WO 2009/030758 A1 | 3/2009 |
| WO | 2011/049618 | 12/2011 |
| WO | 2013/191867 | 12/2013 |

OTHER PUBLICATIONS

"API Specification for Materials and Testing for Well Cements", API Spec. 10, 5th ed., pp. 7, 19-21, Jul. 1, 1980.

Sersale, "Portland-Zeolite-Cement for Minimizing Alkali-Aggregate Expansion", 1987.

Smith, "Cementing" Society of Professional Engineers, pp. 14, 38, 1987.

Roy, Della M., New Strong Cement Materials: Chemically Bonded Ceramics, Downloaded from www.sciencemag.org on Jul. 29, 2008, pp. 651-658, XP-002490242, Feb. 6, 1987.

API Specification 10: Materials and Testing for Well Cements, pp. 7, 19-30, 1990.

Dillenbeck, Robert L. III, The Effect of Microsilica on the Thermal Stability of Lightweight Cement Systems, Society of Petroleum Engineers, pp. 116-1-116-5, XP-002490243, 1990.

Smith, "Cementing" Society of Petroleum Engineers, p. 38, 1990.

"Appendix A", API RP 13B-2, 2d ed.; pp. 6-8, Dec. 1, 1991.

Dalrymple et al., "A Selective Water Control Process", SPE 24330, 1992.

Harris et al., "Successful Remedial Operations Using Ultrafine Cement", SPE 24294, 1992.

Heathman et al., "Case Histories Regarding the Application of Microfine Cements", Cementing Technical Paper SPE 23926, 1992.

Sugama, "Carbonation of Hydrothermally Treated Phosphate-Bonded Calcium Aluminate Cements", pp. 1-9 (undated but admitted as prior art), 1992.

Marfil, "Zeolite Crystallization in Portland Cement Concrete Due to Alkali-Aggregate Reaction", 1993.

Amer. Assoc. of Hwy. and Transportation Officials, ASTM Designation C42-94, Std. Test for Obtaining and Testing Drilled cores & Sawed Beams of Concrete, pp. 24-27, 1994.

"Nano-silica—an additive for high-strength concrete," Wagner et al., Wissenschaftliche Zeitschrift—Hoschule fuer Architektur und Bauwesen Weimar—Universitaet, 40 (5/6/7), 183-87, abstract only, 1994.

Atkins, "Zeolite P in Cements: Its Potential for Immobilizing Toxic and Radioactive Waste Species", 1995.

Halamickova, "Water Permeability and Chloride Ion Diffusion in Portland Cement Mortars: Relationship to Sand Content and Critical Pore Diameter", Cement and Concrete Research, vol. 25, No. 4, pp. 790-802, 1995.

Janotka, "The Properties of Mortar Using Blends With Portland Cement Clinker, Zeolite Tuff and Gypsum", 1995.

ASTM Designation C496-96, Standard Test Method for Splitting Tensile Strength of cylindrical Specimens, pp. 265-268, 1996.

"Manufacture of supplementary cementitious materials from cement kiln dust", Mishulovich et al., World Cement Research and Development, p. 116-120, Mar. 1996.

Rogers, "Designing a Remedial Acid Treatment for Gulf of Mexico Deepwater Turbidite Sands Containing Zeolite Cement", 1996.

Sugama, "Hot Alkali Carbonation of Sodium Metaphosphate Modified Fly Ash/Calcium Aluminate Blend Hydrothermal Cements", pp. 1661-1672, Sep. 11, 1996.

Janotka, "Effect of Bentonite and Zeolite on Durability of Cement Suspension Under Sulfate Attack", 1998.

Naiqian, "Study on the Suppression Effect of Natural Zeolite on Expansion of Concrete Due to Alkali-Aggregate Reaction", 1998.

Chan, Comparative Study of the Initial Surface Absorption and Chloride Diffusion of High Performance Zeolite Silica Fume and PFA concretes, 1999.

Ding, "Extreme Vertices Design of Concrete With Combined Mineral Admixtures", 1999.

Poon, "A Study of the Hydration of Natural Zeolite Blended Cement Pastes", 1999.

(56) References Cited

OTHER PUBLICATIONS

Rieker et al., Particle Size Distribution Inferred from Small0Angle X-ray Scattering and Transmission Electron Microscopy, Langmuir, pp. 638-641, 1999.
Feng, "Zeolite Ceramiste Cellular Concrete", 2000.
Halliburton Zonal Isolation "Shear Bond Testing", Specialized Testing 434.030, Global Laboratory Best Practices, vol. 4, Mar. 2000.
Bartlet-Gouedard, "A Non-Conventional Way of Developing Cement Slurry for Geothermal Wells", 2001.
Material Safety Data Sheet by Nyacol Nano Technologies, Inc., "Nyacol Nyasil 5" dated Sep. 6, 2001 and "Nyacol Nyasil 20", May 17, 2001.
"Effect of nano-SiOx and silica fume on cement paste water demand," Li et al., Shenyang Jianzhu gongcheng Xueyuan Xuebao, Ziran Kexueban, 18(4), 278-281, abstract only, 2002.
Flores-Velez, Characterization & Properties of Portland Cement Composites Incorp. Zinc-Iron Oxide Nanoparti~les~Journoafl Materials Science, pp. 983-988, XP-002490244, 2002.
"Hydration reaction between C3S and fly ash, silica fume, nano-SiO2, and microstructure of hydrated pastes," Ba et al., Guisuanyan Xuebao, 30(6), 780-784, abstract only, 2002.
Industrial Specialties, "Basic Know-How About silica", 2002 Eka Chemicals found at http://colloidalsilica.comlhtmlfiles/7__1asp, 2002.
Industrial Specialties, "The cementing Tool", 2002 Eka Chemicals found at http:l/www.colloidalsilica.com/htmlfiles/1__3__3.asp, 2002.
"Comparison on properties of high strength concrete with nano-SiO2 and silica fume added," Ye et al., Jianzhu Cailiao Xuebao, 6(4), 381-385, abstract only, 2003.
"Effect of secondary interface microstructure on pore structure and performance of cement-based materials," Feng et al., Cailiao Yanjiu Xuebao, 17(5), 489-494, abstract only, 2003.
Research on properties of Portland cement added with nano-SiO2, Wang et al., RILEM Proceedings (2003), PRO 32 (International Conference on Advances in Concrete and Structures, vol. 1), 154-161, abstract only, 2003.
"Study on compound effect of silica fume and nano-SiOx for cementing composite materials," Tang et al., Guisuanyan Xuebao, 3(5), 523-527, abstract only, 2003.
Jerzy Chrusciel and Ludomir Slusarski, Synthesis of Nanosilica by the Sol-Gel Method and its Activity Toward Polymers, Materials Science, vol. 21, pp. 461-469, Nov. 4, 2003.
"Accelerating effects of colloidal nano-silica for beneficial calcium-silicate-hydrate formation in cement," Bjornstrom et al., Chemical Physics Letters, 392 (1-3), 242-248, abstract only, 2004.
"Effect of the particle size on the micro and nanostructural features of calcium phosphate cement: a kinetic analysis", Biomaterials 25, 3453-3462, 2004.
"Experimental study on cement-based composites with nano-SiO2," Feng et al., Cailiao Kexue Yu Gongcheng Zuebao Bianjibu, 22(2), 224-227, 2004.
"Optimization of silica fume, fly ash and amorphous nano-silica in superplasticized high-performance concrete," Collepardi et al., American Concrete Institute, SP 2004, SP-221 (Eight CANMET/ACI International Conference on Fly Ash, Silica Fume, Slag, and Natrural Pozzolans in Concrete, 495-505, abstract only, 2004.
"Strong and bioactive composites containing nano-silica-fused whiskers for bone repair," Xu et al., Biomaterials, 25(19), 4615-4626, abstract only, 2004.
"Alkali-activated binders by use of industrial by-products", Buchwald et al., Cement and concrete Research 35, p. 968-793, 2005.
Answer 3 of 24 Chemical Abstracts on STN "Effect of cement kiln dust substitution on chemical and physical properties and compressive strength of Portland and slag cements", Adb El-aleem et al. (abstract only), 2005.
"Beneficial use of Solid Waste in Maine", Apr. 14, 2005.
Hashimoto et al., Particle size distribution analysis for nano-Si02 powder by ultra-small angle X-ray scattering (USAXS) using synchrotron radiation, ASS, pp. 227-230, 2005.
"Kiln Dusts", Apr. 14, 2005.
"Nano-concrete: possibilities and challenges," Balaguru et al., RILEM Proceedings (2005), PRO 45 (2nd Int'l Symposium on Nanotechnology in construction (NICOM2), 233-243, abstract only, 2005.
"Preparation of multifunctional dry-power paints," Yanmin Gao, Faming Zhuanli Shenqing gongkai Shuomingshu, 4 pages, abstract only, 2005.
"Standards for the Management of Cement Kiln Dust Waste", Apr. 14, 2005.
"Use of Cement Kiln Dust for the Stabilization of Soils", R. L. Parsons, et al., Apr. 14, 2005.
"A comparative study on the pozzolanic activity between nano-SiO2 and silica fume," Ye et al., Journal of Wuhan Univ of Technology, Mat'ls Science Edition, 21(3), 153-157, abstract only, 2006.
"Investigations on the preparation and mechanical properties of the nano-alumina reinforced cement composite," Li et al., Materials Letters, 0(3), 356-359, abstract only, 2006.
Li et al., "Investigations on the preparation and mechanical properties of the nano-alumina reinforced cement composite", Science Direct Materials Letters 60, pp. 356-359, 2006.
"Research on Reinforcement of cement composites and relevant mechanism," Yu et al., Qiangdoa Keji Daxue Xuebao, Ziran Kexueban, 27(2), 148-151, abstract only, 2006.
Cembinder W, "Deepwater Cementing", Eka Chemicals and Akzo Nobel, Jun. 2006.
Dan Mueller and Ramy Eid, Characterizing Early-State Physical Properties, Mechanical Behavior of Cement Designs, Drilling Contractor, pp. 50-52, Jun. 2006.
Konstantin Sobolev, NSF Workshop on Nanomodification of Cementitious Materials: Portland Cement Concrete and Asphalt Concrete, "Nanomodification of Cement", Aug. 2006.
Cardenas and Struble, Electrokinetic Nanoparticle Treatment of Hardened Cement Paste for Reduction of Permeability, Journal of Materials in Civil Eng. @ ASCE, pp. 554-560, Aug. 2006.
OSHA and ANSI, Material Safety Data Sheet, Silicon Nanopowder, Oct. 2006.
"Antagonistic Effect of superplasticizer and colloidal nanosilica in the hydration of Alite and Belite pastes," Bjoernstrom et al., Journal of Materials Science, 42(11), 3901-3907, abstract only, 2007.
"Application of nanometer silica in inorganic nonmetallic materials," Deng et al., Taoci (Xiangyang China), (9), 8-12, abstract only, 2007.
Campillo et al., "Improvement of initial mechanical strength by nanoalumina in belite cements", Science Direct, Materials Letters 61, pp. 1889-1892, 2007.
"Effect of Nano-SiO2 on heat of hydration of portland cement," Xu et al., Nanjing Gongye Daxue Xuebao, Ziran Kexeuban, 29(4), 45-48, abstract only, 2007.
Halim et al., "Preparation of an ultra fast binding cement from calcium silicate-based mixed oxide nanoparticles", Nanotechnology 18, 2007.
"Reaction mechanism analyses of cement based composite materials modified by nano-silica," Xu et al., Kuangye Gongcheng (Changsha, China), 27(3), 99-102, abstract only, 2007.
Konstantin Sobelev and Miguel Ferrada-Gutierrez, Nanotechnology of Concrete (printed from Internet), Feb. 20, 2007.
Alfa Aesar A. Johnson Matthew Company, Search Result Pages for "Nano", Apr. 25, 2007.
Chang et al., "Material Properties of Portland Cement Paste with Nano-Montmorillonite," J. Material Science, May 18, 2007.
Answer 13 of 24 Chemical Abstracts on STN "Manufacture of ceramic particles from floatstone and fly ash", CN 1182062 (abstract only) (undated but admitted as prior art), 2008.
Darbe, "Slurry Design Considerations for Mechanically Enhanced Cement Systems", AADE-08-DF-HO-06, 2008.
Epik Energy brochure entitled "Nanocement", 2008.

(56) References Cited

OTHER PUBLICATIONS

He et al., "Chloride Permeability and Microstructure of Portland Cement Mortars Incorporating Nanomaterials", Abstract, Transportation Research Board Annual Meeting 2007 Paper #08-1041, 2008.
Hunter, "Three Key Mechanisms Deliver Zonal Isolation", IADC, 2008.
Nanofil SE 3000, "Active nanofiller for polymr applications", Product Bulletin/Nanofil, Southern Clay Products, 2008.
Ravi, "Interventionless Zonal Isolation", Cementing, May 2008.
Montmorillonite, Wikipedia encyclopedia, 2009.
Physical Properties of Klkem Microsilica, at http://www.refractories.elkem.com (printed from Internet), Mar. 5, 2009.
Wikipedia, Nanoparticle, at http://en.wikipedia.org/wiki/Nanoparticle (Printed from Internet), Mar. 9, 2009.
Andrew R. Barron, Chemical composition of Portland Cement, viewed on Aug. 26, 2013, last edited by author on Jan. 4, 2010.
HES Brochure "SCR-100 Cement Retarder a Valuable Time Saver", 1994.
HES Brochure "SSA-1 Strenght-Stabilizing Agent", 1998.
HES Brochure "Pozmix Cement and Pozmix 140", 1999.
HES Brochure "ThermaLock™ Cement for Corrosive $CO_2$ Environments", Apr. 2006.
HES Brochure "GasCon 469, Cement Additive", May 2006.
HES Brochure "Silicalite", Jul. 2006.
HES Brochure "Halad-344 Fluid Loss Additive", Aug. 2007.
HES Brochure HR-5 Cement Additive, Aug. 2007.
HES Brochure "GasStop HT", Aug. 2007.
HES Brochure "Halad-413 Fluid Loss Additive", Aug. 2007.
HES Brochure "Howco Suds Surfactant", Aug. 2007.
HES Brochure "HR-7 Cement Retarder", Aug. 2007.
HES Brochure "HR-12 Cement Retarder", Aug. 2007.
HES Brochure "HR-15 Cement Retarder", Aug. 2007.
HES Brochure "HR-25 Cement Retarder", Aug. 2007.
HES Brochure "Pozmix a Cement Additive", Aug. 2007.
HES Brochure "Halad-23 Fluid Loss Additive", Aug. 2007.
HES Brochure "SCR-500L High Temp Retarder", Aug. 2007.
HES Brochure "Latex 2000", Aug. 2007.
HES Brochure "Micro Matrix Cement", Aug. 2007.
HES Brochure "SSA-2, Coarse Silica Four", Feb. 2007.
HES Brochure "MICROSAND Cement Additive, H01460", Apr. 2007.
HES Brochure "AQF-2 Foaming Agent", Jan. 2008.
HES Brochure, "WellLife III Cementing Service for CO2 Environments", Jun. 2009.
HES Brochure "HR-4 Cement Retarder", Aug. 2010.
HES Brochure "SCR-100 Cement Retarder", Nov. 2010.
HES Brochure, "WellLife III Cementing Service", Jan. 2012.
"3M Scotchlite, Glass Bubbles Floated Product Series Product Information", 2002.
Lafarge brochure "TerraCem™", Aug. 2006.
Lafarge MSDS "Cement Kiln Dust", Mar. 3, 2005.
Lafarge MSDS "LaFarge Blended Cement (cement)", Mar. 3, 2005.
Nanocor brochure entitled "Nanoclay Structure", Jun. 24, 2008.
Nanocor Technical brochure entitled "Nanoclay Structures", May 5, 2006.
Schlumberger brochure, "Future Active set-cement technology for long-term zonal isolation", 2007.
TXI Material Safety Data Sheet for PRESSUR-SEAL, Oct. 2003.
Nyacol Nano Technologies, Inc., Silica Additives, Sep. 1998.
Nyacol Nano Technologies, Inc., NexSil Silicon Wafer Polishing Slurries NexSil 3500, 6000, 5000 and 5000 HP, May 2005.
Nyacol Nano Technologies, Inc., NexSil Aqueous Colloidal Silica, Nov. 2005.
Office Action from U.S. Appl. No. 10/775,348, Nov. 23, 2005.
Office Action from U.S. Appl. No. 11/223,671, Dec. 15, 2005.
Office Action from U.S. Appl. No. 11/271,431, Mar. 6, 2006.
Final Office Action from U.S. Appl. No. 11/223,671, Mar. 31, 2006.
Final Office Action from U.S. Appl. No. 10/775,348, May 2, 2006.
Final Office Action from U.S. Appl. No. 11/271,431, May 17, 2006.
Notice of Allowance from U.S. Appl. No. 10/775,348, Jun. 6, 2006.
Office Action from U.S. Appl. No. 11/271,431 (Advisory Action), Jul. 11, 2006.
Office Action from U.S. Appl. No. 11/416,563, Jul. 21, 2006.
Office Action from U.S. Appl. No. 11/403,032, Jul. 24, 2006.
Office Action from U.S. Appl. No. 11/271,431, Aug. 15, 2006.
Office Action from U.S. Appl. No. 11/440,627, Aug. 21, 2006.
Office Action from U.S. Appl. No. 11/402,741, Oct. 19, 2006.
Office Action from U.S. Appl. No. 11/484,951, Oct. 26, 2006.
Notice of Allowance from U.S. Appl. No. 11/271,431, Nov. 2, 2006.
Office Action from U.S. Appl. No. 11/484,951, Dec. 21, 2006.
Office Action from U.S. Appl. No. 11/223,703, Jan. 17, 2007.
Final Office Action from U.S. Appl. No. 11/402,741, Feb. 2, 2007.
Office Action from U.S. Appl. No. 11/223,485, Feb. 28, 2007.
Office Action from U.S. Appl. No. 11/223,669, Feb. 28, 2007.
Notice of Allowance from U.S. Appl. No. 11/484,951, Mar. 12, 2007.
Office Action from U.S. Appl. No. 11/271,690, Mar. 13, 2007.
Office Action from U.S. Appl. No. 11/402,741, Mar. 22, 2007.
Final Office Action from U.S. Appl. No. 11/223,703, Apr. 25, 2007.
Final Office Action from U.S. Appl. No. 11/402,741, May 29, 2007.
Final Office Action from U.S. Appl. No. 11/223,669, Jun. 18, 2007.
Notice of Allowance from U.S. Appl. No. 11/416,754, Jul. 2, 2007.
Notice of Allowance from U.S. Appl. No. 11/223,485, Aug. 3, 2007.
Office Action from U.S. Appl. No. 11/257,261, Aug. 10, 2007.
Notice of Allowance from U.S. Appl. No. 11/271,690, Aug. 13, 2007.
Office Action from U.S. Appl. No. 11/402,741, Sep. 6, 2007.
Office Action from U.S. Appl. No. 11/223,669, Oct. 9, 2007.
Office Action from U.S. Appl. No. 11/223,750, Oct. 16, 2007.
Notice of Allowance from U.S. Appl. No. 11/416,754, Oct. 17, 2007.
Notice of Allowance from U.S. Appl. No. 11/257,261, Oct. 23, 2007.
Final Office Action from U.S. Appl. No. 11/402,741, Oct. 24, 2007.
Notice of Allowance from U.S. Appl. No. 11/223,750, Dec. 11, 2007.
Notice of Allowance from U.S. Appl. No. 11/402,741, Dec. 13, 2007.
Notice of Allowance from U.S. Appl. No. 11/388,644, Jan. 3, 2008.
Office Action from U.S. Appl. No. 11/223,669, Jan. 29, 2008.
Notice of Allowance from U.S. Appl. No. 11/256,824, Feb. 27, 2008.
Notice of Allowance from U.S. Appl. No. 11/223,703, Feb. 27, 2008.
Office Action from U.S. Appl. No. 11/747,002, Apr. 2, 2008.
Final Office Action from U.S. Appl. No. 11/223,669, Apr. 8, 2008.
Office Action from U.S. Appl. No. 12/008,923, May 20, 2008.
Office Action from U.S. Appl. No. 11/747,002, May 27, 2008.
Notice of Allowance from U.S. Appl. No. 11/223,669, Jun. 30, 2008.
Office Action from U.S. Appl. No. 11/747,002, Jul. 10, 2008.
Notice of Allowance from U.S. Appl. No. 12/008,923, Jul. 22, 2008.
Notice of Allowance from U.S. Appl. No. 11/747,002, Oct. 21, 2008.
Notice of Allowance from U.S. Appl. No. 12/034,886, Oct. 21, 2008.
Office Action from U.S. Appl. No. 11/747,002, Dec. 22, 2008.
Office Action from U.S. Appl. No. 11/747,002, Mar. 3, 2009.
Office Action from U.S. Appl. No. 11/388,645, Apr. 3, 2009.
Final Office Action from U.S. Appl. No. 11/388,645, Jul. 30, 2009.
Office Action from U.S. Appl. No. 11/388,645, Dec. 10, 2009.
Office Action from U.S. Appl. No. 12/426,645, May, 5, 2010.
Office Action from U.S. Appl. No. 12/472,561, May, 5, 2010.
Notice of Allowance from U.S. Appl. No. 12/426,645, Jun. 23, 2010.
Notice of Allowance from U.S. Appl. No. 12/472,561, Jun. 29, 2010.
Office Action from U.S. Appl. No. 12/426,393, Jul. 2, 2010.
Final Office Action from U.S. Appl. No. 11/388,645, Aug. 17, 2010.
Office Action from U.S. Appl. No. 12/833,189, Oct. 1, 2010.
Office Action from U.S. Appl. No. 12/833,189, Nov. 10, 2010.
Notice of Allowance from U.S. Appl. No. 12/426,393, Dec. 16, 2010.

(56) References Cited

OTHER PUBLICATIONS

Office Action from U.S. Appl. No. 12/833,189, Feb. 17, 2011.
Office Action from U.S. Appl. No. 12/567,782, Apr. 5, 2011.
Office Action from U.S. Appl. No. 12/651,662, Apr. 5, 2011.
Office Action from U.S. Appl. No. 12/567,783, Apr. 6, 2011.
Office Action from U.S. Appl. No. 12/263,954, Apr. 20, 2011.
Final Office Action from U.S. Appl. No. 12/833,189, May 16, 2011.
Office Action from U.S. Appl. No. 12/833,189, Jul. 18, 2011.
Office Action from U.S. Appl. No. 12/263,954, Aug. 8, 2011.
Final Office Action from U.S. Appl. No. 12/567,783, Aug. 23, 2011.
Office Action from U.S. Appl. No. 12/651,662, Sep. 15, 2011.
Final Office Action from U.S. Appl. No. 12/833,189, Oct. 11, 2011.
Office Action from U.S. Appl. No. 12/651,662, Nov. 28, 2011.
Office Action from U.S. Appl. No. 12/833,189, Feb. 7, 2012.
Office Action from U.S. Appl. No. 12/567,782, Mar. 2, 2012.
Office Action from U.S. Appl. No. 13/052,471, Mar. 6, 2012.
Office Action from U.S. Appl. No. 12/651,662, Mar. 14, 2012.
Final Office Action from U.S. Appl. No. 13/052,471, Jun. 28, 2012.
Office Action from U.S. Appl. No. 12/567,782, Jul. 25, 2012.
Office Action from U.S. Appl. No. 12/651,662, Aug. 2, 2012.
Office Action from U.S. Appl. No. 13/431,701, Nov. 9, 2012.
Office Action from U.S. Appl. No. 13/052,471, Feb. 4, 2013.
Office Action from U.S. Appl. No. 12/833,189, Feb. 6, 2013.
Final Office Action from U.S. Appl. No. 12/567,782, Feb. 8, 2013.
Final Office Action from U.S. Appl. No. 12/651,662, Feb. 13, 2013.
Final Office Action from U.S. Appl. No. 13/443,934, Mar. 4, 2013.
Final Office Action from U.S. Appl. No. 12/263,954, Mar. 14, 2013.
Final Office Action from U.S. Appl. No. 13/435,701, Mar. 14, 2013.
Final Office Action from U.S. Appl. No. 13/458,112, Mar. 15, 2013.
Notice of Allowance from U.S. Appl. No. 12/651,662, May 10, 2013.
Final Office Action from U.S. Appl. No. 13/052,471, May 10, 2013.
Final Office Action from U.S. Appl. No. 12/833,189, May 28, 2013.
Office Action from U.S. Appl. No. 12/567,782, Jun. 21, 2013.
Office Action from U.S. Appl. No. 13/443,934, Jun. 27, 2013.
Office Action from U.S. Appl. No. 13/435,701, Jul. 11, 2013.
Office Action from U.S. Appl. No. 13/458,112, Sep. 15, 2013.
Office Action from U.S. Appl. No. 12/263,954, Oct. 8, 2013.
Notice of Allowance from U.S. Appl. No. 12/567,782, Oct. 8, 2013.
Notice of Allowance from U.S. Appl. No. 12/833,189, Oct. 15, 2013.
PCT International Search Report and Written opinion for PCT/GB2008/001524, Nov. 10, 2009.
PCT International Searching Authority for International Application No. PCT/GB2009/002596, Jul. 23, 2010.
PCT International Search Report for International Application No. PCT/GB2010/001805, Mar. 31, 2011.
PCT International Search Report for International Application No. PCT/GB2010/001806, Mar. 31, 2011.
PCT International Search Report and Written Opinion for International Application No. PCT/GB2011/000003, Jul. 7, 2011.
PCT International Preliminary Report on Patentability and Written Opinionfor International Application No. PCT/GB2009/002596, May 3, 2011.
PCT International Search Report and Written Opinion for International Application No. PCT/GB2010/000485, Oct. 25, 2011.
PCT International Search Report and Written Opinion for International Application No. PCT/GB2010/001045, Nov. 29, 2011.
Communication from EPO for EPO Application No. 12159772.8, Mar. 5, 2012.
PCT International Preliminary Report and Written Opinion for International Application No. PCT/GB2010/001805, Mar. 27, 2012.
PCT International Preliminary Report and Written Opinion for International Application No. PCT/GB2010/001806, Mar. 27, 2012.
PCT International Written Opinion for International Application No. PCT/GB/2011/000003, Jul. 4, 2012.
PCT Search Report and Written Opinion for International Application No. PCT/US2013/038343, Jul. 31, 2013.
USPTO Office Action for U.S. Appl. No. 12/567,783 dated Oct. 3, 2013.
USPTO Office Action for U.S. Appl. No. 13/435,701 dated Oct. 4, 2013.
EPO Office Action for Application Serial No. 09751959.9 dated Sep. 27, 2013.
USPTO Office Action for U.S. Appl. No. 13/458,112 dated Dec. 26, 2013.
USPTO Notice of Allowance for U.S. Appl. No. 13/052,471 dated Jan. 30, 2014.
HES Brochure "FlexPlug Services" dated Apr. 2008.
HES Brochure "Thermatek Services" dated May 2005.
HES Brochure "Fuse-It Circulation Treatment" dated May 2006.
USPTO Office Action for U.S. Appl. No. 14/145,402 dated Jun. 19, 2014.
USPTO Office Action for U.S. Appl. No. 14/145,402 dated Oct. 23, 2014.
EPC Official Action for Application EP14184678 dated Jan. 28, 2015.
USPTO Official Action for U.S. Appl. No. 14/145,402 dated Feb. 6, 2015.
USPTO Final Office Action for U.S. Appl. No. 14/145,402 dated Mar. 3, 2016.
USPTO Office Action for U.S. Appl. No. 14/145,402 dated Jun. 30, 2016.

* cited by examiner

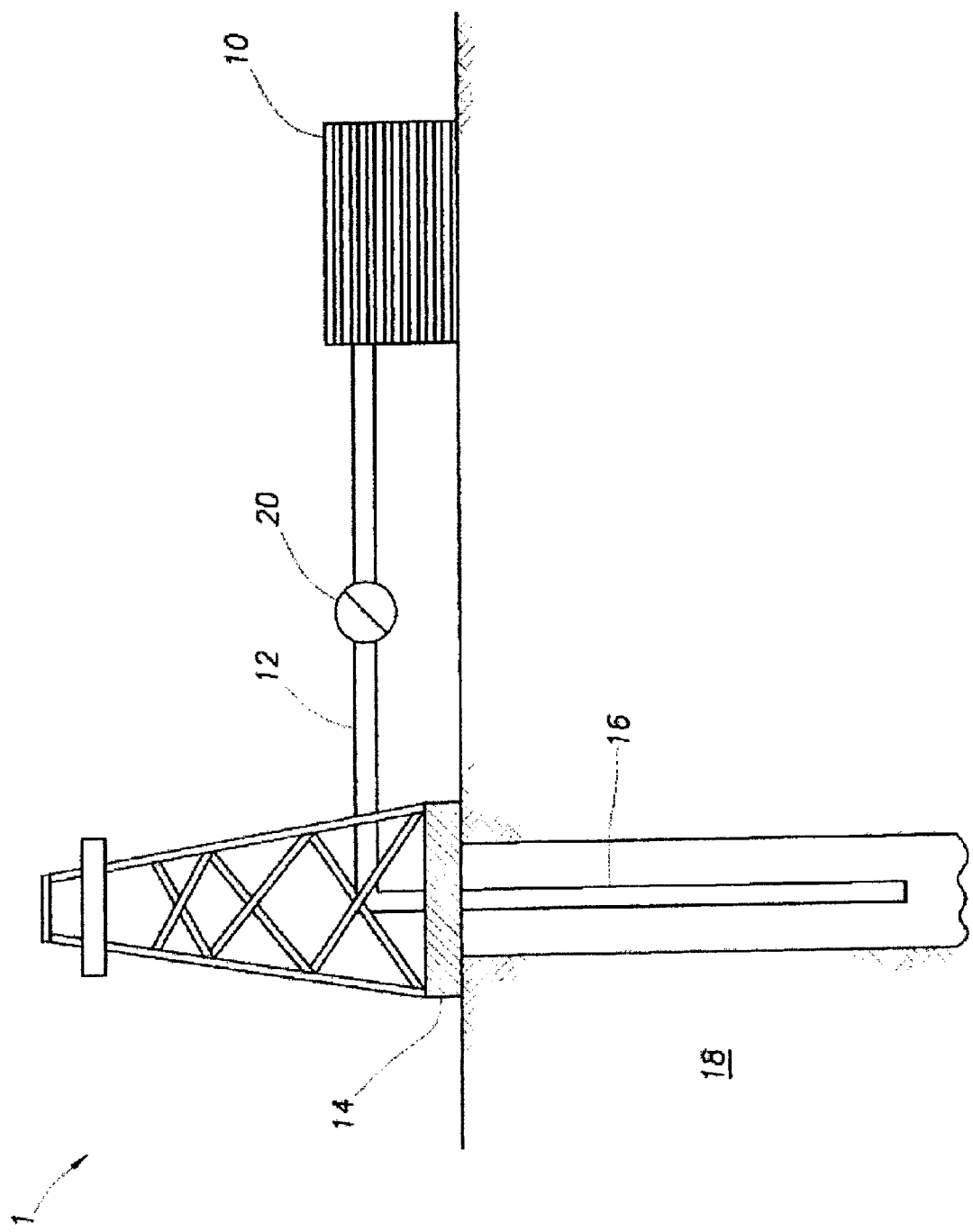

WELL TREATMENT FLUIDS AND METHODS UTILIZING NANO-PARTICLES

CROSS-REFERENCE TO RELATED APPLICATIONS

The present application is a continuation-in-part of U.S. patent application Ser. No. 12/833,189, filed on Jul. 9, 2010, which is a divisional of U.S. patent application Ser. No. 12/472,561, filed on May 27, 2009 (now issued as U.S. Pat. No. 7,784,542), which is a continuation-in-part of U.S. patent application Ser. No. 12/426,645, filed on Apr. 20, 2009 (now issued as U.S. Pat. No. 7,806,183), which is a continuation-in-part of U.S. patent application Ser. No. 11/747,002, filed on May 10, 2007 (now issued as U.S. Pat. No. 7,559,369), the entire disclosures of which are incorporated herein by reference.

BACKGROUND

The example embodiments relate to well treatment compositions and methods utilizing nano-particles and, more particularly, to well cement compositions and methods utilizing particulate nano-silica.

In general, well treatments include a wide variety of methods that may be performed in oil, gas, geothermal and/or water wells, such as drilling, completion and workover methods. The drilling, completion and workover methods may include, but are not limited to, drilling, cementing, logging, perforating, fracturing, acidizing, gravel packing, and conformance methods. Many of these well treatments are designed to enhance and/or facilitate the recovery of desirable fluids from a subterranean well.

In cementing methods, such as well construction and remedial cementing, well cement compositions are commonly utilized. For example, in subterranean well construction, a pipe string (e.g., casing and liners) may be run into a well bore and cemented in place using a cement composition. The process of cementing the pipe string in place is commonly referred to as "primary cementing." In a typical primary cementing method, a cement composition may be pumped into an annulus between the walls of the well bore and the exterior surface of the pipe string disposed therein. The cement composition sets in the annular space, thereby forming an annular sheath of hardened, substantially impermeable cement that supports and positions the pipe string in the well bore and bonds the exterior surface of the pipe string to the subterranean formation. Among other things, the annular sheath of set cement surrounding the pipe string functions to prevent the migration of fluids in the annulus, as well as protecting the pipe string from corrosion. Cement compositions also may be used in remedial cementing methods, such as squeeze cementing and the placement of cement plugs.

In operation, the annular sheath of cement formed between the well bore and the pipe string often suffers structural failure due to pipe movements which cause shear stresses to be exerted on the set cement. Such stress conditions are commonly the result of relatively high fluid pressures and/or temperatures inside the cemented pipe string during testing, perforating, fluid injection or fluid production. For example, such stress may occur in wells subjected to steam recovery or production of hot formation fluids from high-temperature formations. The high-internal pipe pressure and/or temperature can result in the expansion of the pipe string, both radially and longitudinally, which places stresses on the cement sheath causing the cement bond between the exterior surfaces of the pipe or the well bore walls, or both, to fail and thus allow leakage of formation fluids and so forth. Accordingly, it may be desirable for the cement composition utilized for cementing pipe strings in the well bores to develop high strength after setting and to have sufficient resiliency (e.g., elasticity and ductility) to resist loss of the cement bond between the exterior surfaces of the pipe or the well bore walls, or both. Also, it may be desirable for the cement composition to be able to resist cracking and/or shattering that may result from other forces on the cement sheath. For example, it may be desirable for the cement sheath to include structural characteristics that protect its structural integrity from forces associated with formation shifting, overburden pressure, subsidence, tectonic creep, pipe movements, impacts and shocks subsequently generated by drilling and other well operations. In addition to including components that improve mechanical properties of the cement, in a number of cementing methods, it may also be desirable to include one or more set accelerators in the well cement compositions to counteract certain constituents and/or environmental characteristics that excessively slow set times. For example, among other things, low temperatures and cement additives (e.g., fluid loss control additives and dispersants) can cause or contribute to an excessive set time for a cement composition. Accordingly, in certain situations, it may be desirable to reduce the set time by including a set accelerator in the cement composition. That is, the set accelerator may be included in a cement composition to counteract components of the cement composition or conditions surrounding the cement composition that are causing an excessive set time.

BRIEF DESCRIPTION OF THE DRAWINGS

These drawings illustrate certain aspects of some of the embodiments of the present method, and should not be used to limit or define the method.

The FIGURE depicts an example of a system for delivering treatment fluids.

DESCRIPTION OF SPECIFIC EMBODIMENTS

The example embodiments relate to well treatment compositions and methods utilizing nano-particles and, more particularly, to well cement compositions and methods utilizing particulate nano-silica.

An exemplary embodiment of the cement compositions comprises cement, water and particulate nano-silica. Those of ordinary skill in the art will appreciate that the exemplary cement compositions generally should have a density suitable for a particular application. By way of example, the cement composition may have a density in the range of from about 4 pounds per gallon ("ppg") to about 20 ppg. In exemplary embodiments, the cement compositions may have a density in the range of from about 8 ppg to about 17 ppg. Exemplary embodiments of the cement compositions may be foamed or unfoamed or may comprise other means to reduce their densities, such as hollow microspheres, low-density elastic beads, or other density-reducing additives known in the art. Those of ordinary skill in the art, with the benefit of this disclosure, will recognize the appropriate density for a particular application.

Exemplary embodiments of the cement compositions comprise a cement. Any of a variety of cements suitable for use in subterranean cementing operations may be used in accordance with exemplary embodiments. Suitable examples include hydraulic cements that comprise calcium, aluminum, silicon, oxygen and/or sulfur, which set and harden by reaction with water. Such hydraulic cements, include, but are not limited to, Portland cements, pozzolana cements, gypsum cements, high-alumina-content cements, slag cements, silica cements and combinations thereof. In certain embodiments, the hydraulic cement may comprise a Portland cement. The Portland cements that may be suited for use in exemplary embodiments are classified as Class A, C, H and G cements according to American Petroleum Institute, *API Specification for Materials and Testing for Well Cements*, API Specification 10, Fifth Ed., Jul. 1, 1990.

The water used in exemplary embodiments of the cement compositions may be freshwater or saltwater (e.g., water containing one or more salts dissolved therein, seawater, brines, saturated saltwater, etc.). In general, the water may be present in an amount sufficient to form a pumpable slurry. In exemplary embodiments, the water may be present in the cement compositions in an amount in the range of from about 33% to about 200% by weight of the cement on a dry basis ("bwoc"). In exemplary embodiments, the water may be present in an amount in the range of from about 35% to about 70% bwoc.

In addition, exemplary embodiments of the cement compositions comprise nano-silica. The nano-silica may be described as particulate nano-silica. That is, the nano-silica may be particulate in nature and not, for example, a colloidal silica or a suspension of silica in solution. Indeed, in one embodiment, the particulate nano-silica may be added to the cement composition as a dry nano-silica powder. Generally, the particulate nano-silica may be defined as nano-silica having a particle size of less than or equal to about 100 nm. For example, the particulate nano-silica may have a particle size in the range of from about 1 nm to about 100 nm (about $1 \times 10^9$ m to about $100 \times 10^{-9}$ m). In certain exemplary embodiments, the particulate nano-silica may have a particle size of less than or equal to about 50 nm. For example, the particulate nano-silica may have a particle size in the range of from about 5 nm to about 50 nm. In further exemplary embodiments, the particulate nano-silica may have a particle size of less than or equal to about 30 nm. For example, the particulate nano-silica may have a particle size in the range of from about 5 nm to about 30 nm. However, it should be noted that the particulate nano-silica may be utilized in combination with differently sized silica particles in accordance with present embodiments. For example, a number of silica particles with particle sizes greater than 100 nm may be included in a cement composition in accordance with present embodiments.

It is now recognized that the particulate nano-silica utilized with present embodiments, which may include silicon dioxide, may have an impact on certain physical characteristics of resulting cements. For example, relative to inclusion of colloidal silica or larger silica particles in a cement slurry, inclusion of particulate nano-silica in the cement slurry may provide improved mechanical properties, such as compressive strength, tensile strength, Young's modulus and Poisson's ratio. In addition, the particulate nano-silica also may be included in the cement composition as a set accelerator to accelerate the set time of the resultant cement composition. Accordingly, a cement composition in accordance with present embodiments may comprise a sufficient amount of particulate nano-silica to provide the desired characteristics in a resulting cement. In exemplary embodiments, the particulate nano-silica may be present in the cement composition in an amount in the range of from about 1% to about 25% bwoc. In exemplary embodiments, the particulate nano-silica may be present in the cement composition in an amount in the range of from about 5% to about 15% bwoc.

Other additives suitable for use in subterranean cementing operations also may be added to exemplary embodiments of the cement compositions. Examples of such additives include, strength-retrogression additives, set accelerators, weighting agents, weight-reducing additives, heavyweight additives, lost-circulation materials, filtration-control additives, dispersants, defoaming agents, foaming agents, and combinations thereof. Specific examples of these, and other, additives include crystalline silica, amorphous silica, salts, fibers, hydratable clays, vitrified shale, microspheres, fly ash, lime, latex, thixotropic additives, combinations thereof and the like. A person having ordinary skill in the art, with the benefit of this disclosure, will readily be able to determine the type and amount of additive useful for a particular application and desired result.

As will be appreciated by those of ordinary skill in the art, exemplary embodiments of the cement compositions may be used in a variety of subterranean applications, including primary and remedial cementing. Exemplary embodiments of the cement compositions may be introduced into a subterranean formation and allowed to set therein. Exemplary embodiments of the cement compositions may comprise cement, water and the particulate nano-silica. By way of example, in exemplary primary cementing embodiments, a cement composition may be introduced into a space between a subterranean formation and a pipe string located in the subterranean formation. The cement composition may be allowed to set to form a hardened mass in the space between the subterranean formation and the pipe string. In addition, in exemplary remedial cementing embodiments, a cement composition may be used, for example, in squeeze-cementing operations or in the placement of cement plugs. One or more hydrocarbons (e.g., oil, gas, etc.) may be produced from a well bore penetrating the subterranean formation.

While the preceding discussion is directed to the use of particulate nano-silica, those of ordinary skill in the art will also appreciate that it may be desirable to utilize other types of nano-particles, in accordance with embodiments. Examples of such nano-particles include nano-alumina, nano-zinc oxide, nano-boron, nano-iron oxide and combinations thereof. In certain exemplary embodiments, the nano-particles may be particulate in nature and not, for example, a colloidal nano-particle or a suspension of the nano-particle in solution. Furthermore, while the preceding discussion is directed to the use of particulate nano-silica in well cementing methods, those of ordinary skill in the art will appreciate that the present technique also encompasses the use of nano-particles in any of a variety of different subterranean treatments. For example, the nano-particles may be included in any of a number of well treatment fluids that may be used in subterranean treatments, including drilling fluids, completion fluids, stimulation fluids and well clean-up fluids. In accordance with another embodiment, the nano-particles may be included as proppant in a well treatment fluid. For example, a well treatment fluid containing the nano-particles may be introduced into a subterranean formation at or above a pressure sufficient to create or enhance or more fractures in the subterranean formation. Enhancing a fracture includes enlarging a pre-existing fracture in the formation. At least a portion of the nano-particles may be deposited in the one or more fractures such that the fractures are prevented from fully closing upon the release of pressure, forming conductive channels through which fluids may flow to (or from) the well bore.

With regard to fracturing fluids, these fluids are commonly viscosified, gelled and/or crosslinked. The function of the fracturing fluid is used to apply pressure to the formation rocks around the well, up to a pressure whereby the formation is fractured. One essential function of these fluids is to be capable of suspending a proppant and especially to carry this proppant without settling into the fracture created by the fluid. Once again the rheology, especially the so called "suspension" property, and the stability of these fluids is of first importance, as well as the property of fluid loss control.

In addition to the use of the nano-particles without encapsulation, embodiments may include encapsulation of the nano-particles to facilitate transportation and incorporation of the nano-particles in well treatment fluids (e.g., cement compositions). Specifically, encapsulation of the nano-particles in accordance with present embodiments may include enclosing the nano-particles within an outer coating or container in particulate form. Exemplary methods of encapsulation are set forth in U.S. Pat. Nos. 5,373,901; 6,444,316; 6,527,051; 6,554,071; 7,156,174; and 7,204,312, the relevant disclosures of which are incorporated herein by reference.

Various types of encapsulation may be employed such that the nano-particles (e.g., the particulate nano-silica) are contained but retains its particulate nature and, thus, retains its corresponding impact on physical properties of cement slurries. For example, the nano-particles may be encapsulated within a bag, capsule, layer, coating or the like. Further, the material utilized to encapsulate the nano-particles may be selected to facilitate transportation and/or incorporation of the nano-particles into a well treatment fluid. For example, to facilitate handling of the nano-particles and/or to facilitate timed release of the nano-particles, the encapsulation material may be degradable. This may facilitate handling of the nano-particles by allowing inclusion of the encapsulated nano-particles in a well treatment fluid without requiring that the nano-particles first be removed from the encapsulating material. Further, the encapsulating material may be designed to degrade at a certain rate when in contact with certain materials (e.g., water) so that the nano-particles are released into the well treatment fluid at a desired time. Exemplary water-dissolvable materials that may be utilized to encapsulate the nano-particles are described in U.S. Pat. Nos. 4,961,790 and 5,783,541, the relevant disclosures of which are incorporated herein by reference.

In accordance with exemplary embodiments, the cement compositions may utilize a packing volume fraction suitable for a particular application as desired. As used herein, the term "packing volume fraction" refers to the volume of the particulate materials in a fluid divided by the total volume of the fluid. The size ranges of the preferred particulate materials are selected, as well as their respective proportions, in order to provide a maximized packing volume fraction so that the fluid is in a hindered settling state. It is known that, in such a state, the particulate materials behave "collectively" like a porous solid material. The hindered settling state is believed to correspond, in practice, to a much higher solid material concentration in the fluid than that present in the some traditional cement compositions.

The present embodiments may include a combination of at least three features to obtain a maximum packing volume fraction. One is the use of at least three particulate materials wherein at least three particulate materials are in size ranges "disjointed" from one another. In some embodiments, each of the three particulate materials may include a different particle size selected from the following ranges: about 7 nm to about 50 nm, about 0.05 microns to about 0.5 microns, 0.5 microns to about 10 microns, about 10 microns to about 20 microns, about 20 microns to about 200 microns, about 200 microns to about 800 microns, and greater than about 1 millimeter. For example, a first particulate material may include particles sized from about 7 nm to about 50 nm, a second particulate material may include particles sized from about 0.05 microns to about 0.5 microns, and a third particulate material may include particles sized from about 10 microns to about 20 microns. In accordance with present embodiments, the first particulate material includes at least one of nano-silica, nano-alumina, nano-zinc oxide, nano-boron, nano-iron oxide or combinations thereof. Another feature of present embodiments may include a choice of the proportions of the three particulate materials in relation to the mixing, such that the fluid, when mixed, is in a hindered settling state. Another feature may include the choice of the proportions of the three particulate materials between each other, and according to their respective size ranges, such that the maximum packing volume fraction is at least substantially achieved for the sum total of all particulate materials in the fluid system. Packing volume fraction is described in further detail in U.S. Pat. Nos. 5,518,996 and 7,213,646, the relevant portions of which are incorporated herein by reference.

In various embodiments, systems configured for delivering the treatment fluids described herein to a downhole location are described. In various embodiments, the systems can comprise a pump fluidly coupled to a tubular, the tubular containing a treatment fluid comprising a proppant comprising nano-particulates.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluid to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluid to the high pressure pump. In such embodiments, the low pressure pump may "step up" the pressure of the treatment fluid before it reaches the high pressure pump.

In some embodiments, the systems described herein can further comprise a mixing tank that is upstream of the pump and in which the treatment fluid is formulated. In various embodiments, the pump (e.g., a low pressure pump, a high pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

The FIGURE shows an illustrative schematic of a system that can deliver treatment fluids of the present invention to a downhole location, according to one or more embodiments. It should be noted that while the FIGURE generally depicts a land-based system, it is to be recognized that like systems may be operated in subsea locations as well. As depicted in the FIGURE, system 1 may include mixing tank 10, in which a treatment fluid of the present invention may be formulated. The treatment fluid may be conveyed via line 12 to wellhead 14, where the treatment fluid enters tubular 16, tubular 16 extending from wellhead 14 into subterranean formation 18. Upon being ejected from tubular 16, the treatment fluid may subsequently penetrate into subterranean formation 18. Pump 20 may be configured to raise the pressure of the treatment fluid to a desired degree before its introduction into tubular 16. It is to be recognized that system 1 is merely exemplary in nature and various additional components may be present that have not necessarily been depicted in the FIGURE in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in the FIGURE, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in the FIGURE.

To facilitate a better understanding of the present technique, the following examples of some specific embodiments are given. In no way should the following examples be read to limit, or to define, the scope of the invention.

EXAMPLE 1

Five different cement slurries (i.e., Slurry A, Slurry B, Slurry C, Slurry D and Slurry E) were prepared. The slurries and resulting set cements were then tested to determine setting or thickening times and other physical properties of each of the five different slurries. As set forth below, the respective test results for the five different slurries demonstrate that inclusion of particulate nano-silica in the slurry reduces the set time and increases the strength of the resulting cement relative to cements resulting from inclusion of the other silica components that were tested.

Slurries A, B, C and D were prepared by dry blending dry components with cement prior to adding water to form the respective slurry. Slurry E was prepared by dry blending dry components with cement prior to adding water and then adding colloidal silica to form the respective slurry. Further, each of the five slurries included a different type of silica. Two of the five slurries included particulate nano-silica in accordance with present embodiments, and the other three included silica in different forms and sizes (e.g., colloidal silica and micro-silica). While the silica included in each of the five slurries was different, the other components utilized in each of the five slurries were similar. Specifically, in addition to a specific type of silica, each of the five slurries included 100% bwoc of Class G cement, 0.5% bwoc of a retarder, and sufficient water to make the density of the slurry approximately 12.00 lbs/gal. The specific retarder utilized in the slurries was HR-5 cement retarder, which is a sulfomethylated lignosulfonate. It should be noted that HR5 cement retarder is available from Halliburton Energy Services, Inc. and is described in U.S. Pat. No. RE31,190.

As set forth above, each of the five slurries included a different type of silica and sufficient water to make the resulting slurry have a density of 12.00 ppg. Slurries A and B included particulate nano-silica in accordance with present embodiments and 15.36 gal/sk of water. Specifically, Slurry A included 15% bwoc of particulate nano-silica having a particle size of approximately 30 nm, and Slurry B included particulate nano-silica having a particle size of approximately 10 nm. Slurry C included 15% bwoc of SILICALITE cement additive and 15.68 gal/sk of water. SILICALITE (compacted) cement additive, which is available from Halliburton Energy Services, Inc., Duncan, Okla., is an amorphous silica generally sized in a range from about 2.5 microns to about 50 microns. Slurry D included 15% bwoc of MICROSAND cement additive and 15.77 gal/sk of water. MICROSAND cement additive, which is available from Halliburton Energy Services, Inc., Duncan, Okla., is a crystalline silica ground to a substantially uniform particle size distribution of approximately 5 to 10 microns. Slurry E included 5.12 gal/sk of GasCon 469™ lightweight cement additive and 10.09 gal/sk of water. GASCON 469 lightweight cement additive is available from Halliburton Energy Services, Inc., Duncan, Okla., and may be defined as a colloidal silicic acid suspension containing suspended silicic acid particles generally having a particle size of less than about 20 nm.

After the five slurries were prepared, tests were performed to determine various physical characteristics associated with inclusion of the different silica components in each of the associated cement compositions. One of these tests was performed to measure a thickening time associated with each of the five slurries. Specifically, the total thickening time (TTT) associated with each cement slurry was determined by performing a thickening-time test in accordance with API Recommended Practice 10, *API Specification for Materials and Testing for Well Cements*. The measurement of the TTT for each slurry was based on the respective slurry reaching a consistency of 70 Bearden units (Bc) at 80° F. The results of these measurements are set forth for each of the five slurries in Table 1 below.

Additional tests were performed on the cement slurries to determine force-resistance properties (e.g., compressive strength, shear-bond strength, and tensile strength) for each of the slurries. Each of the force-resistance property tests was performed on the respective cement slurries at a temperature of 80° F. and after the slurries had set for 72 hours. The force-resistance property tests included nondestructive and destructive ultrasonic strength tests, a compressive-strength test, a shear-bond test, and a tensile-strength test. The nondestructive and destructive ultrasonic analyzer tests were conducted using a UCA ultrasonic cement analyzer to determine a $UCA_{72\ hrs}$ value and a $UCA_{crush}$ value, respectively. The compressive-strength tests and UCA analyzer tests were performed in accordance with API Recommended Practice 10B. Further, shear-bond and Brazilian-tensile-strength tests were performed to determine shear strength and tensile strength values, respectively, for the different cement compositions. The shear-bond-strength tests were performed as described in SPE 764 entitled "A Study of Cement—Pipe Bonding" by L. G. Carter and G. W. Evans. The Brazilian-tensile-strength tests were performed in accordance with ASTM C496-96. The results of the tests performed on each of the five compositions are shown in Table 1 below.

TABLE 1

| Slurry | Silica Type | TTT to 70 Bc (Hr:Min) | $UCA_{72\ hrs}$ (psi) | $UCA_{crush}$ (psi) | Comp. Strength (psi) | Shear-Bond Strength (psi) | Brazilian Tensile Strength (psi) |
|---|---|---|---|---|---|---|---|
| Slurry A | 30 nm particulate nano-silica | 2:43 | 328 | 419 | 428 | 169 | 148.28 |
| Slurry B | 10 nm particulate nano-silica | 5:00 | 500 | 481 | 402 | 51 | 14.72 |
| Slurry C | Amorphous silica | 14:32 | 266 | 206 | 211 | 98 | 95.5 |
| Slurry D | Crystalline Silica | 20:00+ | 260 | 285 | 252 | 37.2 | 102.16 |
| Slurry E | Colloidal Silica | 20:00+ | 225 | 219 | 374 | 42.4 | 84.71 |

EXAMPLE 2

Samples of Slurries A, C, D and E discussed above were also tested to determine various additional physical properties associated with the resulting set cements and to confirm relative differences demonstrated above. While different instruments and calibration settings were used in the additional testing of the slurries, the test data indicates that relative differences between the different slurries are similar to those differences illustrated in Example 1. Indeed, as indicated above in Example 1, the respective test results in Example 2 for the five different cements demonstrate that inclusion of particulate nano-silica in the cement composition increases the strength of the resulting cement relative to cements resulting from inclusion of the other silica components that were tested.

Three samples for each of the three conventional cement slurries (Slurry C, Slurry D, and Slurry E) and four samples of Slurry A were tested to determine compressive strength, Young's modulus, and Poisson's ratio. The compressive-strength tests were performed in accordance with API Specification 10. It should be noted that the compressive-strength measurements in Example 1 are different than those in Example 2 because different equipment and different calibrations were utilized. However, the relative differences between compressive strengths for each of the five slurries are similar. The Young's modulus and Poisson's ratio were statically determined by means of compression testing using a load frame. The Young's modulus or modulus of elasticity for each sample was obtained by taking a ratio of a simple tension stress applied to each sample to a resulting strain parallel to the tension in that sample. The Poisson's ratio for each sample was determined by calculating a ratio of transverse strain to a corresponding axial strain resulting from uniformly distributed axial stress below a proportional limit of each sample. The values determined for the three samples of each of the five different cement slurries are set forth below in Table 2.

TABLE 2

| Slurry | Sample | Silica Type | Compressive Strength (psi) | Young's Modulus | Poisson's Ratio |
|---|---|---|---|---|---|
| Slurry A | Sample 1 | 30 nm particulate nano-silica | 1257 | 2.26E+05 | ** |
| Slurry A | Sample 2 | 30 nm particulate nano-silica | 1189 | 2.12E+05 | 0.109 |
| Slurry A | Sample 3 | 30 nm particulate nano-silica | 1249 | 2.04E+05 | 0.092 |
| Slurry A | Sample 4 | 30 nm particulate nano-silica | 1275 | 2.13E+05 | 0.110 |
| Slurry C | Sample 1 | Amorphous silica | 466 | 2.53E+05 | 0.064 |
| Slurry C | Sample 2 | Amorphous silica | 483 | 2.38E+05 | 0.064 |
| Slurry C | Sample 3 | Amorphous silica | 506 | 2.40E+05 | 0.053 |
| Slurry D | Sample 1 | Crystalline Silica | 350 | 1.42E+05 | 0.068 |
| Slurry D | Sample 2 | Crystalline Silica | 397 | 1.50E+05 | 0.063 |
| Slurry D | Sample 3 | Crystalline Silica | 378 | 1.46E+05 | 0.060 |

TABLE 2-continued

| Slurry | Sample | Silica Type | Compressive Strength (psi) | Young's Modulus | Poisson's Ratio |
|---|---|---|---|---|---|
| Slurry E | Sample 1 | Colloidal Silica | 514 | 1.03E+05 | 0.063 |
| Slurry E | Sample 2 | Colloidal Silica | 598 | 1.15E+05 | 0.072 |
| Slurry E | Sample 3 | Colloidal Silica | 627 | 1.23E+05 | 0.071 |

The particular embodiments disclosed above are illustrative only, as the example embodiments may be susceptible to various modifications and alternative forms. However, it should be understood that the embodiments are not intended to be limited to the particular embodiments disclosed. Rather, the embodiments cover all modifications, equivalents and alternatives falling with the scope and spirit of the present invention as defined by the following appended claims. In addition, every range of values (of the form, "from about a to about b," or, equivalently, "from approximately a to b," or, equivalently, "from approximately a-b") disclosed in the present Description of Specific Embodiments is to be understood as referring to the power set (the set of all subsets) of the respective range of values, and set for the every range encompassed within the broader range of value.

What is claimed is:

1. A method of treating a subterranean formation comprising:
providing particles, wherein the particles comprise three size ranges disjointed from one another, wherein a first size range includes nano-particles from about 7 nm to about 50 nm, wherein a second size range includes particles from about 0.05 microns to about 0.5 microns, and wherein a third size range includes particles from about 200 microns to about 800 microns, wherein the nano-particles comprise nano-boron, wherein the nano-particles are particulate and non-colloidal and encapsulated in a degradable coating;
including the particles in a treatment fluid;
introducing into the subterranean formation the treatment fluid at or above a pressure sufficient to create or enhance one or more fractures in the subterranean formation, wherein the nano-particles are included as proppant in the treatment fluid; and
depositing at least a portion of the nano-particles in the one or more fractures, wherein the fractures are prevented from fully closing upon the release of pressure and wherein the fractures form conductive channels through which fluids may flow.

2. The method of claim 1, wherein the nano-particles further comprise nano-silica.

3. The method of claim 1, wherein the nano-particles further comprise at least one nano-particle selected from the group consisting of nano-aluminum, nano-zinc oxide, nano-iron oxide and combinations thereof.

4. The method of claim 1, further comprising producing one or more hydrocarbons from a well bore penetrating the subterranean formation.

5. A method of treating a subterranean formation comprising:
providing particulate materials, wherein the particulate materials comprise three size ranges disjointed from one another, wherein a first size range includes nano-particles from about 7 nm to about 50 nm, wherein a second size range includes particles from about 0.05 microns to about 0.5 microns, and wherein a third size range includes particles from about 200 microns to about 800 microns, wherein the nano-particles comprise nano-boron, wherein the nano-particles are non-colloidal and encapsulated in a degradable coating;
including the particulate materials in a treatment fluid;
introducing the treatment fluid comprising the particulate materials into the subterranean formation at or above a pressure sufficient to create or enhance one or more fractures in the subterranean formation, wherein the fractures form conductive channels through which fluids may flow,
determining a packing volume fraction for the particulate materials in the treatment fluid.

6. The method of claim 5, wherein the nano-particles further comprise nano-silica.

7. The method of claim 5, wherein the nano-particles further comprise a particulate nano-silica.

8. The method of claim 5, wherein the nano-particles further comprise at least one nano-particle selected from the group consisting of nano-aluminum, nano-zinc oxide, nano-iron oxide and combinations thereof.

9. A method of treating a subterranean formation comprising:
providing particles, wherein the nano-particles are particulate and non-colloidal, wherein the nanoparticles comprise nano-boron;
including the nano-particles in a treatment fluid;
introducing into the subterranean formation the treatment fluid at or above a pressure sufficient to create or enhance one or more fractures in the subterranean formation, wherein the nano-particles are included as proppant in the treatment fluid; and
depositing at least a portion of the nano-particles in the one or more fractures, wherein the fractures are prevented from fully closing upon the release of pressure and wherein the fractures form conductive channels through which fluids may flow.

10. The method of claim 9, wherein the nano-particles further comprise nano-silica.

11. The method of claim 9, wherein the proppant comprises a particulate blend of at least particles less than 0.5 microns and particulates greater than 1 millimeter.

12. The method of claim 9, wherein the nano-particles have a particle size of less than or equal to about 100 nm.

13. The method of claim 9, wherein the nano-particles have a particle size in the range of from about 1 nm to about 100 nm.

14. The method of claim 9, further comprising producing one or more hydrocarbons from a well bore penetrating the subterranean formation.

* * * * *